| United States Patent Office | 2,965,534
Patented Dec. 20, 1960 |
|---|---|

2,965,534

INHIBITING THE GROWTH OF PLANT VIRUSES

Walter A. Darlington, Dayton, Ohio, assignor to Monsanto Chemical Company, St. Louis, Mo., a corporation of Delaware No Drawing. Filed Apr. 21, 1958, Ser. No. 729,521

12 Claims. (Cl. 167—22)

The invention relates to the inhibition of the growth of viruses which attack plants, and more particularly to chemotherapy as applied to the control of plant viruses.

Viruses have been defined as submicroscopic entities capable of being introduced into specific living cells and of reproducing inside such cells only. This definition summarizes the chief characteristics of viruses—small size, infectivity host specificity, and complete dependence on the integrity of the host cell. The intimate relationship between the virus and the host cell is the most distinguishing feature of the virus, and necessitates a more subtle approach to the chemotherapy of virus than to that of other infectious agents, such as bacteria and fungi.

Viruses have long plagued mankind, but their existence was recognized first in 1892. It is now known that viruses afflict plants, insects, bacteria and animals, and seem to be increasing in importance. This invention is, of course, limited to the treatment of virus diseases of plants.

There seems no doubt that plant virus diseases are more important now than they were even a decade ago, though the reasons for this are far from clear. Some of this increase is no doubt due to the introduction of viruses from one country to another in imported bulbs, tubers and plants. It is a difficult matter to prevent the entry of viruses by quarantine regulations, especially when no one, including the exporter, may be aware of the existence of the virus in question. The virus of tomato spotted wilt is a good example of this. It was first described in Australia in 1915; about 15 years later it was identified at Cambridge, England, in an ornamental plant found in a Cardiff nursery. At the present time, its distribution is practically world-wide, having been passed easily from country to country in dahlia tubers and other vegetative organs of plants.

Although no intelligent estimate of the damages caused by plant viruses can be made, the problem is now being recognized as serious. Virus diseases are a serious problem in the farming of sugar beet, sugar cane, tomato, bean cocoa, orange, tobacco, potato, peach, strawberry, raspberry, broccoli, cabbage, hops and many flowers. In severe cases, e.g. with peach and sugar beet, virus diseases may force abandonment of large areas for the cultivation of a crop. In less severe cases, a virus disease may result in a decrease in yield and quality. It has been estimated that tobacco mosaic virus causes an annual loss of 40 million pounds of tobacco in the United States of America alone.

The great trade in seed potatoes amounting to half a million tons a year between England, Scotland and Ireland is based entirely on the prevalence of potato viruses and their aphis vectors in England. One potato virus alone, the ubiquitous potato virus X which in the United States used to be called the "healthy potato virus," is responsible for a loss of ten percent of the world's potato crop, while the losses of potatoes in Britain, due to virus infection, have been put at one million tons per year.

The grower of sugar beets, especially in East Anglia, is only too familiar with "virus yellows" which, in an early season infection, may reduce sugar content by 50%.

The situation as regards the cabbage and broccoli crop becomes yearly more serious. There are two aphisborne viruses which attack those plants causing them to be dwarfed and crinkled and prevent the formation of heart or curd.

Of flowering plants, possibly dahlias are the most seriously affected by viruses and, being propagated by tubers, the situation resembles in many ways the disastrous one which results from growing potatoes in England from home-saved "seed."

In the United States, in addition to most of the viruses found in England there are several other important diseases such as curly-top of sugar beets and yellows of asters. Both the viruses causing these diseases have a wide host range and give rise to serious infections in many other crops.

In tropical regions there are many important virus diseases such as swollen-shoot of cocoa, phloem-necrocis of tea, rosette of ground-nuts and many others. A serious situation has arisen in the clove industry in Zanzibar where the clove trees have been dying in large numbers. The disease which causes the sudden collapse of vigorous trees has been called the sudden death disease and by a process of elimination of all other possible causes is now considered to be due to a virus.

Of all these tropical virus diseases, however, by far the most serious is "swollen shoot" of the cocoa tree. In the Gold Coast this virus disease probably started about 1920, although it was not till 1936 that reports were received of the "dying back" of large numbers of trees. At first there seemed to be only a few areas affected, but soon reports were received from many areas that the disease was spreading, and 10,000 trees were known to be dying. Up to 1939, trees were dying at the rate of one million a year. The annual rate between 1939 and 1945 was five million and between 1945 and 1948 it rose to fifteen million. It is clear that the cocoa industry will not long be able to survive losses on that scale.

Although the losses to viruses are impressive, few control measures have been developed. Of the curative measures investigated, selected inactivation of a virus by the application of heat is generally not practical, and chemotherapy has been used very little. Control of insect-transmitted virus diseases by control of the insect vectors, although attractive, has not been too successful. Other control measures of a negative nature, are: destruction of infected plants (roguing); isolation from sources of infection; eradication of alternate hosts; use of healthy planting material; and use of disease-resistant varieties. Although these practices are adequate in certain cases, none is generally applicable and all have definite limitations.

It is an object of this invention to provide a chemical method of treating plants to inhibit the growth of viruses in the plants.

It is another object of this invention to provide a chemical method of treating tobacco plants to inhibit the growth of tobacco mosaic virus therein.

It is still another object of this invention to provide a chemical method of treating field pinto beans to inhibit the growth of tobacco mosaic virus therein.

It is a further object of this invention to provide a chemical method of treating field pinto beans to inhibit the growth of tobacco ringspot virus therein.

These and other objects of the invention will become apparent as the detailed description of the invention proceeds.

The invention is the method of inhibiting the growth of viruses in plants by treating the plants with at least a sufficient amount of a chemical compound to inhibit the growth of the viruses. Chemical compounds which I have discovered to be effective in inhibiting the growth of viruses in plants are compounds of the formula

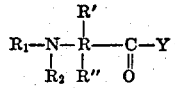

and salts thereof, e.g. the hydrochloride, the nitrate, the sulfate, the dodecylbenzenesulfonic acid salt, etc. In the formula R is a straight-chain alkyl hydrocarbon radical having from 1 to 3 carbon atoms, R', R'', $R_1$ and $R_2$ are selected from the class consisting of hydrogen and hydrocarbon radicals having from 1 to 18 carbon atoms, Y is a radical selected from the class consisting of hydroxyl, amino, —$OR_5$ where $R_5$ is a hydrocarbon radical having from 1 to 18 carbon atoms, —OX where X is an alkali metal and

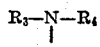

radicals where $R_3$ and $R_4$ are selected from the class consisting of hydrogen and hydrocarbon radicals having from 1 to 18 carbon atoms, and at least one of R', R'', $R_1$, $R_2$, $R_3$, $R_4$, and $R_5$ is a hydrocarbon radical. Preferred compounds of the highest anti-virus activity are those where at least one of R', R'', $R_1$, $R_2$, $R_3$, $R_4$, and $R_5$ are either long chain alkyl hydrocarbon radicals having from 7 to 18 carbon atoms or lower aliphatic unsaturated hydrocarbon radicals or the salts of either.

The growth-inhibiting chemical can be applied to the plants in a number of different ways, but it is preferred to apply it by spraying the plant foliage with a water solution or suspension of the chemical in at least a sufficient concentration to inhibit virus growth in the plant. The chemical compound can be applied to the plant by spraying, diping in the case of potted plants, dusting with the chemical dispersed in an inert powder, or by other conventional means, and the chemical can even be applied indirectly to the plant by treating the soil whereby the chemical is absorbed by the plant through its root system. An additional method of applying would be by suspending small particles of the chemical in a stream of air or other gas, and spraying the plant with this suspension. The chemical can even be sprinkled on the plants in undiluted liquid or powder form, if desired. In any event the invention does not lie in the particular method of treating the plant. If the chemical is applied in diluted form as will usually be desirable, it will be applied in as concentrated a solution as is readily handleable and which will not cause substantial phytotoxic damage to the plants being treated.

If the chemical is applied in water diluent and is soluble in water, of course, no dispersant will be necessary; although, a wetting agent may still be desirable for maximum effectiveness. If the chemical is not very soluble in water an emulsifying agent may be required to keep it dispersed such as, e.g. alkylbenzenesulfonates, polyalkylene glycols, salts of sulfated long-chain alcohols, sorbitan fatty acid esters, etc., and other emulsifying agents which can be used are listed, e.g., in the U.S. Department of Agriculture Bulletin No. E607. The active chemicals of the invention can also be applied dissolved or dispersed in organic solvents, e.g., liquid hydrocarbons, provided they are substantially non-phytotoxic to the plants. If applied admixed with an inert pulverulent carrier, such carriers as, e.g., talc, bentonite, kieselguhr, diatomaceous earth, etc. can be used.

The following are a list of a number of the active chemical compounds of the invention. This list is given for the purpose of illustration only and is not meant to be limiting. For example, such as listing of some β-alanines or aminopropionic acids of the invention is:

N-methyl-β - alanine, N-ethyl-β - alanine, N-propyl-β-alanine, N-isopropyl-β-alanine, N-butyl-β-alanine, N-isobutyl-β-alanine, N-t-butyl-β-alanine, N-amyl-β-alanine, N-heptyl-β - alanine, N-(4-methyloctyl)-β - alanine, N-dodecyl-β-alanine, N-tridecyl-β - alanine, N-heptadecyl-β-alanine, N-octadecyl-β-alanine, etc. Of the monoalkyl substituted β-alanines, the most active and therefore the preferred ones are higher alkyl compounds having from 7 to 18 carbon atoms; however, the lower alkyl compounds do exhibit anti-virus activity. In the higher alkyl compounds very few branched-chain alkyl substituents were named in order not to unreasonably enlarge the size of this application, but it is intended to cover these as well as the straight chain alkyl substituents. The higher alkyl substituents are preferred, i.e. ones with 7 to 18 carbon atoms.

The substituent group either $R_1$ or $R_2$ of course, can also be an aliphatic hydrocarbon group containing olefinic unsaturation or acetylenic unsaturation and substantial anti-virus activity will be evidenced. For example, N-vinyl-β-alanine, N-allyl-β-alanine, N-1-butenyl-β-alanine, N-2-butenyl-β-alanine, N-isobutenyl-β-alanine, N-1-hexenyl-β - alanine, N-1-octenyl-β - alanine, N-1-dodecenyl-β-alanine, N-1-heptadecenyl-β-alanine, N-1, 4-butadienyl-β-alanine, N-ethynyl-β-alanine, N-1-propynyl-β-alanine, N-2-propynyl-β-alanine, etc. Apparently the aliphatic unsaturation embraces the activity of the compounds as anti-virus agents, and although only a limited number of said compounds are named it is intended to cover them all since my experimental work indicates that they are active.

Likewise, it is indicated that the cycloaliphatic substituted β-alanines are active anti-virus agents. For examples, N-cyclopentyl-β-alanine, N-cyclohexyl-β-alanine, N-(2-cyclohexenyl)-β - alanine, N-(2-ethylcyclohexyl)-β-alanine, etc.

Aromatic substituted and aralkyl substituted β-alanines are also active anti-virus agents. For example, N-phenyl-β - alanine, N-o-tolyl-β - alanine, N-m-tolyl-β-alanine, N-p-tolyl-β-alanine, the N-xylyl-β-alanines, N-(α-naphthyl)-β-alanine, N-(β-naphthyl)-β-alanine, the N-biphenyl-β-alanines, N-benzyl-β-alanine, N-phenethyl-β-alanine, etc.

Compounds are also active wherein both $R_1$ and $R_2$ are hydrocarbon radicals. For example, N-allyl-N-benzyl-β-alanine, N,N-dihexyl-β-alanine, N-phenyl-N-decyl-β-alanine, N,N-diethyl-β-alanine, N,N-dodecyl-β-alanine, etc. It will be realized that all the permutations and combinations described above for the monosubstituted β-alanine as well as others broadly covered by the general formula could have been named here and are active in varying degrees as anti-virus agents, but this would only tend to enlarge the application adding nothing which is not obvious from what has been previously disclosed.

Also β-alanine derivatives of the general formula wherein R' and R'' are hydrocarbon radicals having from 1 to 18 carbon atoms are active as anti-virus agents. For example, 3-dodecylamino-2-methylpropionic acid, 3-allylamino-3-propylpropionic acid, 3-benzylamino-2, 3-dimethylpropionic acid, 3-anilino-2-hexylpropionic acid, 3-ethylamino-2-vinylpropionic acid, 3-methylamino-2-dodecylpropionic acid, 3-methylamino-2-allylpropionic acid, 3 - amino-2 - methylpropionic acid, 3-amino-2-dodecylpropionic acid, 3-amino-3-tridecylpropionic acid, 3-allylamino-2-cyclohexylpropionic acid, 3-ethylamino-2-phenylpropionic acid, 3 - propylamino-2 - (α-naphthyl) propionic acid, 3 - amino-2 - benzylpropionic acid, 3-methylamino-2-(o-tolyl)propionic acid, etc.

Additional compounds of the β-alanine variety which are active anti-virus agents are compounds of the general formula where Y is other than hydroxyl. For example, ethyl N-dodecyl-β-alaninate, dodecyl N-allyl-β-alaninate, propyl N-benzyl-β-alaninate, sodium N-dodecyl-β-alaninate, potassium N-allyl-β-alaninate, lithium N-phenyl-β-alaninate, 3-dodecylamino-propionamide, N'-dodecyl 3-allylaminopropionamide, N',N'-diethyl 3-ethylaminopropionamide, etc. Again the number of compounds named has been restricted since it will be obvious from the general description of the invention and other groups of compounds named what is intended to be covered. The higher alkyl radicals are preferred for maximum activity and a single higher alkyl radical, e.g. dodecyl, attached to the nitrogen atom or to the carbonyl group or through an amino group to the carbonyl group tends to give this anti-virus activity; however, the higher alkyl radical attached to the nitrogen atom of β-alanine appear to give the most active compounds. The lower aliphatic unsaturated substituents also give high anti-virus activity.

I have also found that salts of the β-alanine compounds are active anti-virus agents, but the active compound is actually the β-alanine compound itself and not the salt portion. The salt on contact with water hydrolyzes releasing the β-alanine which is the active constituent. The salt in some cases can have the advantage of getting the aminophenol compound into the plant more efficiently and so promoting the anti-virus action. This can be particularly true of some of the organic salts such as one which will be mentioned illustratively below since the organic salts will tend to hydrolyze more slowly than the inorganic salts mentioned. For example, N-dodecyl-β-alanine·hydrochloride, N-allyl-N-decyl-β-alanine·sulfate, dodecyl N-allyl-β-alaninate·nitrate, tridecyl N-methyl-β-alaninate·sulfate, N-dodecyl-β-alanine·dodecylbenzene sulfonic acid, etc.

Also active as anti-virus chemicals are the α-alanine derivatives. Alpha-alanine derivatives corresponding to all the β-alanine derivatives named and others could be named, but it is not believed that this would serve any useful purpose since it will be obvious from the β-alanine teachings what is intended to be covered. Therefore, only a limited number of the α-alanine compounds will be named, which are: N-dodecyl-α-alanine, N,N-diallyl-α-alanine, N-ethyl-N-benzyl-α-alanine, N-(o-tolyl)-α-alanine, N-(m-tolyl)-2-propyl-α-alanine, dodecyl N-methyl-α-alaninate, ethyl N-dodecyl-α-alaninate, sodium N-tridecyl-α-alaninate, (2-allylamino)propionamide, 2-methylamino-N-dodecylpropionamide, 2-allylamino-N,N-dioctyl-propionamide, ethyl N-dodecyl-α-alaninate·hydrochloride, etc.

Glycine derivatives are also active anti-virus agents. For example, N-benzyl-glycine, N-dodecylglycine, ethyl N-allylglycinate, ethyl N-allylglycinate hydrochloride, dodecyl N-allylglycinate·hydrochloride, ethyl N-ethyl-N-benzylglycinate, (tridecylamino)methylacetic acid, (dodecylamino)acetamide, potassium N-dodecylglycinate, methylamino-N-decylacetamide, etc. Only a limited number of the glycine derivatives have been named specifically but similar glycine derivatives to those named specifically for β-alanine are intended to be covered as well as others covered by the general formula for β-alanine are intended to be covered and these gylcine derivatives are active as anti-virus agents as are the β-alanine derivatives.

The last group of compounds covered by the general formula as anti-virus chemicals are the derivatives of 4-aminobutyric. Again to avoid unnecessarily enlarging this application a limited number of these compounds will be named but it will be understood from the teachings hereinabove particularly with respect to β-alanine derivatives and the general formula what is intended to be covered. For example, 4-(dodecylamino)-butyric acid, N-allyl-N-benzyl-4-aminobutyric acid, decyl 4-(-decylamino)butyrate, 2-ethyl - 4 - (cyclohexylamino)butyric acid, lithium 4-(phenylamino)butyrate, 2,3-dipropyl-4-(allylamino)butyric acid, 4 - (hexadecylamino)butyroamide, N'-dodecyl 4-(allylamino)butyroamide, etc.

The inhibiting effect of the chemicals on virus growth is illustrated as follows: In experiments run substantially according to the method of Commoner et al., Arch. Biochem. Biophys., 27, 271 (1950) tests were conducted showing the inhibiting effects of the chemicals against the multiplication of tobacco mosaic virus. Briefly, the procedure involves inoculation of a young leaf of a healthy turkish tobacco plant with the virus and, after 24 hours, contacting portions of the inoculated leaf with the test compound.

Leaves were inoculated with Johnson tobacco virus by rubbing their entire surface with a gauze pad moistened with a phosphate buffer solution (pH 7.0) containing 200 μg. of the virus per milliliter. After inoculation the leaves were placed under a bell-jar with their petioles in water for 24 hours. At the end of this time, six 0.5" discs were punched from each leaf, weighed, washed in water and the discs of each leaf placed in different 3.5" Petri dishes, each containing a different test chemical in the desired concentration for testing in 15 ml. of half-strength Vickery's solution (Vickery et al., Bull. Conn. Agr. Expt. Sta., 399 (1937)) which had been prepared to have a final concentration of $5 \times 10^{-3}$ mol of $KH_2PO_4$. A "control" was prepared for each leaf by placing another set of six discs from the leaf into a Petri dish containing 15 ml. of the same Vickery's solution but no test chemical. The dishes of discs were incubated for seven days under fluorescent light of 170 foot candles. At the end of that time the discs were removed and two groups of three were made up from each dish in order to provide "checks." The tobacco mosaic virus content of each group was determined as described by Commoner et al. (loc. cit.) except that the final washing step thereof was omitted because it had been previously observed by us that this step in the isolation procedure results in some loss of virus. The colorimetric measurements were made at 750 mμ in a Coleman Universal Spectrophotometer and the amount of virus was read from a standard curve prepared with known amounts of tobacco mosaic virus.

Employing this procedure inhibition of the virus growth was shown for the various test compounds at concentrations which are reported in the Table I below. Some of the more active compounds were tested at lower and lower concentrations in an attempt to determine their minimum effective concentration.

*Table I*

| Chemical Compound | Molar Concentration of Chemical | Percent Inhibition of Virus |
| --- | --- | --- |
| N-dodecyl-β-alanine | $1 \times 10^{-4}$ | 77 |
| ethyl N-phenyl-β-alaninate | $1 \times 10^{-3}$ | 52 |
| allylglycine | $1 \times 10^{-4}$ | 66 |
| ethyl N-dodecylglycinate | $1 \times 10^{-4}$ | 59 |
| dodecyl N-allylglycinate·HCl | $1 \times 10^{-4}$ | 56 |
| ethyl N-allylglycinate·HCl | $5 \times 10^{-5}$ | 80 |
| ethyl α-benzylaminoacetate | $1 \times 10^{-3}$ | 49 |
| ethyl N-isopropylglycinate | $1 \times 10^{-3}$ | 54 |
| N-allyl-α-allylaminoacetamide·HCl | $1 \times 10^{-4}$ | 69 |
| anilino-N-ethylacetamide | $1 \times 10^{-3}$ | 61 |
| diethylamino-N,N-diethylacetamide | $1 \times 10^{-4}$ | 72 |
| diethylamino-N-butylacetamide | $1 \times 10^{-3}$ | 62 |
| 2-amino-2-methylpropionic acid | $1 \times 10^{-3}$ | 69 |
| t-octylamino-N,N-diethylacetamide | $1 \times 10^{-3}$ | 85 |
| DL-2-amino-2,4-dimethylvaleric acid | $1 \times 10^{-3}$ | 55 |
| DL-2-amino-2-methylbutyric acid | $1 \times 10^{-3}$ | 69 |

Several of the more active compounds were also subjected to additional testing on whole plants and the decrease in local lesions was observed on those plants treated with the chemicals as compared to control plants which had no chemical treatment. The host plants used in testing the inhibition of tobacco mosaic virus (TMV) were tobacco plants (*Nicotiana glutinosa*) and field pinto beans; whereas the host plants used in testing the inhibition of tobacco ringspot virus (TRV) were field pinto beans. A typical test is described in the following paragraph although a number of variations on this method have been tried, such as, varying the time interval between inoculation and treatment, chemical treatment preceding inoculation, etc. Of course, controls are run with each test, so the results in each case indicate the effectiveness of the compound.

Plants of the same size and age are divided into equal groups of controls and experimentals. The similar and older leaves are removed from plants (only the primary leaves are used in the case of the bean plants) leaving only leaves of approximately equal size which are to be used in the experiment. These leaves are dusted lightly with carborundum. Then the leaves are inoculated by painting them lightly with a virus solution or an extract from a virus-infected plant. One hour later the experimental plants were sprayed with the test solutions, which were aqueous solutions containing the chemical in the desired concentration and about 1% of a nonionic surface active agent "Atlox 1256" reputed to be a tall oil and ethylene oxide condensation product. The plants are then kept in the greenhouse for 3 to 6 days during which time numerous discrete local lesions appear on the inoculated leaves. The lesions are counted and by comparison with the number of lesions on the control (untreated) plants, the effectiveness of each particular chemical in inhibiting the multiplication of the virus is determined. The data of these tests are contained in Table II below.

Table II

| Chemical Compound | Plant | Virus | Molar Concentration of Chemical | Percent Inhibition of Virus |
|---|---|---|---|---|
| ethyl N-allylglycinate·HCl | tobacco | TMV | 1×10⁻⁴ | 19 |
| dodecyl N-allylglycinate·HCl | tobacco | TMV | 1×10⁻⁴ | 32 |

Thus by the data of Tables I and II is demonstrated the high and unexpected activity of the chemical compounds of the invention in inhibiting the growth of plant viruses. A number of different chemical compounds are shown to be active anti-virus agents. Due to the chemical similarity between viruses it would be expected that a chemical compound shown to inhibit the growth of one plant virus would inhibit others in the same or different plants. Tobacco mosaic virus is typical of the group of viruses of the mosaic type, and tobacco ringspot virus is typical of a second group of viruses of the necrotic type. These are the two main known types of virus diseases.

Although the invention has been described in terms of specified examples which are set forth in considerable detail, it should be understood that this is by way of illustration only and that the invention is not necessarily limited thereto, since alternative embodiments will become apparent to those skilled in the art in view of the disclosure. For example, the term "hydrocarbon radical" is used throughout this patent application in its broader sense, in that a particular R group, i.e., R, R', $R_1$, $R_2$, etc., can also contain substituents other than carbon and hydrogen, such as alkoxy, nitro, cyano, nitroso, halo, etc. which may even enhance to a degree the anti-virus activity of the compound while in other cases the activity will be somewhat reduced. One skilled in the art will recognize that a compound containing a hydrocarbon radical that contains these substituents is the equivalent of the corresponding compound containing a hydrocarbon radical containing only carbon and hydrogen. Particularly, it should be recognized that the claimed compounds and the salts thereof are equivalent since a salt on contact with water will hydrolyze releasing the compound itself, which is the active anti-virus agent, so actually treating plants with the salt is in effect treating the plants with the compound itself. Accordingly, modifications are contemplated which can be made without departing from the spirit of the described invention.

I claim:

1. The method of inhibiting the multiplication of plant viruses comprising applying to plants a virus growth-inhibiting quantity of a compound of the formula

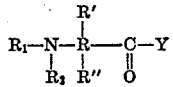

wherein R is a straight-chain alkyl hydrocarbon radical having 1 to 3 carbon atoms, R', R", $R_1$ and $R_2$ are selected from the class consisting of hydrogen and aliphatic hydrocarbon radicals having from 1 to 18 carbon atoms, Y is selected from the class consisting of hydroxyl, amino, —$OR_5$ where $R_5$ is an aliphatic hydrocarbon radical having from 1 to 18 carbon atoms, —OX where X is an alkali metal and

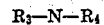

where $R_3$ and $R_4$ are selected from the class consisting of hydrogen and aliphatic hydrocarbon radicals having from 1 to 18 carbon atoms, provided at least one is an aliphatic hydrocarbon radical of from 1 to 18 carbon atoms but not more than one is an aliphatic hydrocarbon radical having from 7 to 18 carbon atoms of R', R", $R_1$, $R_2$, $R_3$, $R_4$ and $R_5$.

2. The method of claim 1, wherein the said plants are tobacco plants and said virus is tobacco mosaic virus.

3. The method of inhibiting the multiplication of plant viruses comprising applying to plants a virus growth-inhibiting quantity of a compound of the formula

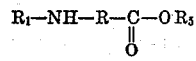

wherein R is a straight-chain alkyl hydrocarbon radical having from 1 to 3 carbon atoms, $R_1$ is an alkyl hydrocarbon radical having from 7 to 18 carbon atoms, and $R_5$ is a lower aliphatic hydrocarbon radical.

4. The method of inhibiting the multiplication of plant viruses comprising applying to plants a virus growth-inhibiting quantity of a compound of the formula

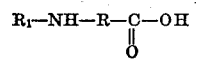

wherein R is a straight-chain alkyl hydrocarbon radical having from 1 to 3 carbon atoms, and $R_1$ is an alkyl hydrocarbon radical having from 7 to 18 carbon atoms.

5. The method of claim 4, wherein said compound is N-dodecyl-β-alanine.

6. The method of inhibiting the multiplication of plant viruses comprising applying to plants a virus growth-inhibiting quantity of a compound of the formula

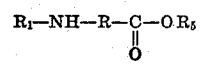

wherein R is a straight-chain alkyl hydrocarbon radical having from 1 to 3 carbon atoms, $R_1$ is a lower aliphatic hydrocarbon radical, and $R_5$ is an alkyl hydrocarbon radical having from 7 to 18 carbon atoms.

7. The method of claim 6, wherein said compound is dodecyl N-allyl-β-alaninate.

8. The method of claim 6, wherein said compound is dodecyl N-allylglycinate.

9. The method of inhibiting the multiplication of plant viruses comprising applying to plants a virus growth-inhibiting quantity of a compound of the formula

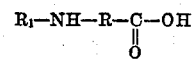

wherein R is a straight-chain alkyl hydrocarbon radical having from 1 to 3 carbon atoms, and $R_1$ is a lower unsaturated aliphatic hydrocarbon radical.

10. The method of claim 9, wherein said compound is allylglycine.

11. The method of inhibiting the multiplication of plant viruses comprising applying to plants a virus growth-inhibiting quantity of a compound of the formula $$R_1-NH-R-\underset{\underset{O}{\|}}{C}-OR_5$$

wherein R is a straight-chain alkyl hydrocarbon radical having from 1 to 3 carbon atoms, $R_1$ is a lower unsaturated aliphatic hydrocarbon radical, and $R_5$ is a lower aliphatic hydrocarbon radical.

12. The method of claim 11, wherein said compound is ethyl N-allylglycinate.

References Cited in the file of this patent

UNITED STATES PATENTS

| | | |
|---|---|---|
| 2,290,174 | Epstein | July 21, 1942 |
| 2,293,034 | Moore | Aug. 18, 1942 |

OTHER REFERENCES

King: U.S. Dept. Agr. Handbook No. 69, May 1954, pp. 45, 181.

Frear: A Catalogue of Insecticides and Fungicides, vol. I, 1947, Chronica Botanica Co., p. 82.

UNITED STATES PATENT OFFICE
CERTIFICATE OF CORRECTION

Patent No. 2,965,534              December 20, 1960

Walter A. Darlington

It is hereby certified that error appears in the above numbered patent requiring correction and that the said Letters Patent should read as corrected below.

Column 5, line 23, strike out "aminophenol".

Signed and sealed this 14th day of May 1963.

(SEAL)
Attest:

ERNEST W. SWIDER
Attesting Officer

DAVID L. LADD
Commissioner of Patents